(12) United States Patent
Kano et al.

(10) Patent No.: US 11,811,284 B2
(45) Date of Patent: *Nov. 7, 2023

(54) STATOR FOR ROTARY ELECTRIC MACHINE AND ROTARY ELECTRIC MACHINE USING SAME

(71) Applicant: Hitachi Astemo, Ltd., Hitachinaka (JP)

(72) Inventors: Yuji Kano, Hitachinaka (JP); Takayuki Koizumi, Hitachinaka (JP); Yasuyuki Saito, Hitachinaka (JP); Seigo Misaki, Hitachinaka (JP); Hisaya Shimizu, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 103 days.

This patent is subject to a terminal disclaimer.

(21) Appl. No.: 17/220,170

(22) Filed: Apr. 1, 2021

(65) Prior Publication Data

US 2021/0328473 A1  Oct. 21, 2021

Related U.S. Application Data

(63) Continuation of application No. 16/072,396, filed as application No. PCT/JP2017/001624 on Jan. 19, 2017, now Pat. No. 11,245,299.

(30) Foreign Application Priority Data

Mar. 31, 2016 (JP) .................................. 2016-069949

(51) Int. Cl.
*H02K 3/28* (2006.01)
*H02K 21/02* (2006.01)
(Continued)

(52) U.S. Cl.
CPC ................ *H02K 3/28* (2013.01); *H02K 3/38* (2013.01); *H02K 17/12* (2013.01); *H02K 47/30* (2013.01)

(58) Field of Classification Search
CPC H02K 3/28; H02K 3/38; H02K 17/12; H02K 47/30
(Continued)

(56) References Cited

U.S. PATENT DOCUMENTS 6,201,332 B1   3/2001   Umeda
6,326,715 B1   12/2001  Asao
(Continued)

FOREIGN PATENT DOCUMENTS

JP   2000-69729 A    3/2000
JP   2003-134711 A   5/2003
(Continued)

OTHER PUBLICATIONS

International Search Report (PCT/ISA/210) issued in PCT Application No. PCT/JP2017/001624 dated Apr. 4, 2017 with English translation (four pages).
(Continued)

*Primary Examiner* — Burton S Mullins
(74) *Attorney, Agent, or Firm* — Crowell & Moring LLP

(57) ABSTRACT

Provided is a rotary electric machine which is configured to draw three-phase output lines from a connection side coil end by an easy process. A stator for a rotary electric machine according to the present invention includes a plurality of segment coils including connection-side winding portions and non-connection-side winding portions. The connection-side winding portions are arranged on one side of a stator core and connected to slots with the same slot pitch, and the non-connection-side winding portions are arranged on the other side of the stator core and inserted into the slots with a plurality of kinds of slot pitches. The connection-side winding portions include a first connection group and a second connection group. The first connection group is provided with a plurality of terminal portions for connecting
(Continued)

the segments, and the second connection group connects layers different from those in the first connection group, and is provided with a plurality of terminal portions.

6 Claims, 14 Drawing Sheets

(51) Int. Cl.
    *H02K 3/38*     (2006.01)
    *H02K 17/12*     (2006.01)
    *H02K 47/30*     (2006.01)

(58) Field of Classification Search
    USPC .......................................................... 310/207
    See application file for complete search history.

(56) References Cited

U.S. PATENT DOCUMENTS

| | | | |
|---|---|---|---|
| 6,700,236 | B2 | 3/2004 | Umeda |
| 6,894,417 | B2 | 5/2005 | Cai et al. |
| 7,348,705 | B2 | 3/2008 | Cai et al. |
| 9,847,686 | B2 | 12/2017 | Tamura |
| 11,245,299 | B2 * | 2/2022 | Kano .................. H02K 3/38 |
| 2001/0011852 | A1 | 8/2001 | Nakamura |
| 2003/0011268 | A1 | 1/2003 | Even |
| 2003/0214190 | A1 | 11/2003 | Congdon et al. |
| 2004/0061400 | A1 | 4/2004 | Fukushima et al. |
| 2008/0042508 | A1 | 2/2008 | Cai |
| 2009/0140596 | A1 | 6/2009 | Kaiser et al. |
| 2012/0104885 | A1 | 5/2012 | Cominetti et al. |
| 2013/0113330 | A1 | 5/2013 | Saito et al. |
| 2014/0319953 | A1 | 10/2014 | Rahman et al. |
| 2014/0361646 | A1 | 12/2014 | Saito et al. |
| 2015/0076953 | A1 | 3/2015 | Tamura |
| 2016/0036282 | A1 | 2/2016 | Nakayama et al. |

FOREIGN PATENT DOCUMENTS

| | | | |
|---|---|---|---|
| JP | 2004-23807 | A | 1/2004 |
| JP | 2004-64883 | A | 2/2004 |
| JP | 3988617 | B2 | 10/2007 |
| JP | 2012-175748 | A | 9/2012 |
| JP | 2012-222874 | A | 11/2012 |
| JP | 2013-90437 | A | 5/2013 |
| JP | 2013-121183 | A | 6/2013 |
| JP | 2014-113047 | A | 6/2014 |
| JP | 2014-180144 | A | 9/2014 |
| JP | 2015-61465 | A | 3/2015 |
| JP | 2015-84635 | A | 4/2015 |
| WO | WO 2007/146252 | A2 | 12/2007 |
| WO | WO 2012/011493 | A1 | 1/2012 |
| WO | WO 2013/108680 | A1 | 7/2013 |
| WO | WO 2015/040468 | A1 | 3/2015 |

OTHER PUBLICATIONS

Japanese-language Written Opinion (PCT/ISA/237) issued in PCT Application No. PCT/JP2017/001624 dated Apr. 4, 2017 (four pages).
German-language Office Action issued in counterpart German Application No. 11 2017 000 288.5 dated Dec. 19, 2018 with English translation (65 pages).
Submission of Publications in Japanese Application No. 2018-508421 with English translation (28 pages), notice received Nov. 9, 2018.
Japanese-language Patent Opposition issued in Japanese Patent No. 6585826 dated Dec. 12, 2019 with English translation (102 pages).
Japanese-language Opposition issued in Japanese Application No. 6585826 dated Apr. 1, 2020 with English translation (132 pages).
Japanese-language Evidence Statement issued in Japanese Application No. 6585826 dated Apr. 1, 2020 with English translation (14 pages).
Japanese-language Office Action issued in Japanese Application No. 2019-162153 dated Nov. 17, 2020 with English translation (10 pages).

* cited by examiner

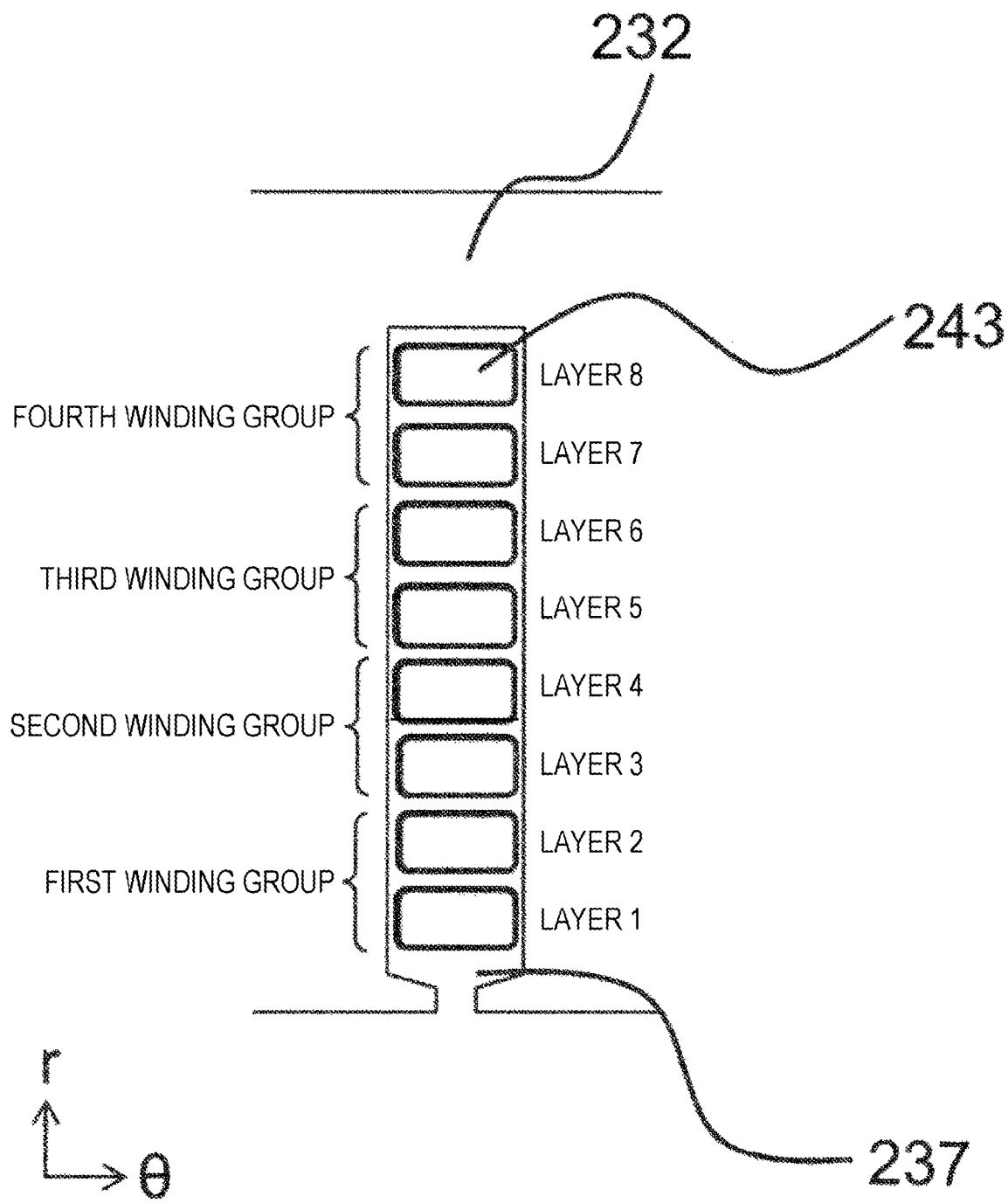

STATOR FOR ROTARY ELECTRIC MACHINE AND ROTARY ELECTRIC MACHINE USING SAME

CROSS-REFERENCE TO RELATED APPLICATIONS

This application is a continuation of U.S. application Ser. No. 16/072,396 filed Jul. 24, 2018; which is a continuation of PCT International Application No. PCT/JP2017/001624, filed on Jan. 19, 2017; which claims priority to Japanese Patent Application No. 2016-069949, filed on Mar. 31, 2016, the disclosure of which are incorporated by reference.

TECHNICAL FIELD

The present invention relates to a rotary electric machine, such as a motor or a power generator, and a stator for a rotary electric machine.

BACKGROUND ART

A rotary electric machine which is used to drive a vehicle needs to be stored within a determined range due to tight restriction in vehicle layout. For example, PTL 1 describes a structure of a rotary electric machine in which three phase lines are arranged in a non-connection side coil end.

In the technology of PTL 1, the three-phase output lines extending from the non-connection side coil end to a current sensor are arranged in the stator for a rotary electric machine, which is illustrated in FIG. 2. Depending on the layout in which a rotary electric machine is arranged, three-phase output lines need to be arranged in a connection side coil end, but for the arrangement, the structure of the rotary electric machine needs to be changed considerably, thereby complicating an assembly process of a stator.

CITATION LIST

Patent Literature

PTL 1: JP 2014-180144 A

SUMMARY OF INVENTION

Technical Problem

An object of the present invention is to provide a rotary electric machine which is configured to draw three-phase output lines from a connection side coil end by an easy process.

Solution to Problem

To solve the above problems, for example, the configurations described in the claims are adopted.

The present invention includes a plurality of solutions to solve the problems, but, as an example, the present invention includes a plurality of segment coils including connection-side winding portions and non-connection-side winding portions. The connection-side winding portions are arranged on one side of a stator core and connected to slots with the same slot pitch, and the non-connection-side winding portions are arranged on the other side of the stator core and inserted into the slots with a plurality of kinds of slot pitches. The connection-side winding portions include a first connection group and a second connection group. The first connection group is provided with a plurality of terminal portions for connecting the segments, and the second connection group connects layers different from those in the first connection group, and is provided with a plurality of terminal portions.

Advantageous Effects of Invention

The present invention requires a plurality of slot pitches for any of a connection side coil end and a non-connection side coil end, but, as described in the present embodiment, coils are arranged with a plurality of slot pitches in the non-connection side coil end, that is, an untwisted segment coil is employed to have a plurality of slot pitches. Thus, according to the present invention, a rotary electric machine can be provided which has a connection side coil end in which coils have the same slot pitch, enabling a twisting process at once, facilitating the process. Problems, configurations, and effects other than those in the above description will be made clear in the following description of the embodiments.

BRIEF DESCRIPTION OF DRAWINGS

FIG. 6 is an enlarged schematic cross-sectional view of one slot of the stator 230 according to the present embodiment taken along an r-θ plane.

DESCRIPTION OF EMBODIMENTS

Hereinafter, embodiments of the present invention will be described.

A rotary electric machine according to the present embodiment is suitable for, for example, a traveling motor for an electric vehicle. The rotary electric machine according to the present invention can be applied to both of a dedicated electric vehicle which travels only by a rotary electric machine and a hybrid electric vehicle which is driven by both of an engine and a rotary electric machine, but, the rotary electric machine applied to the hybrid electric vehicle is described in the following, as an example.

Figure 1:
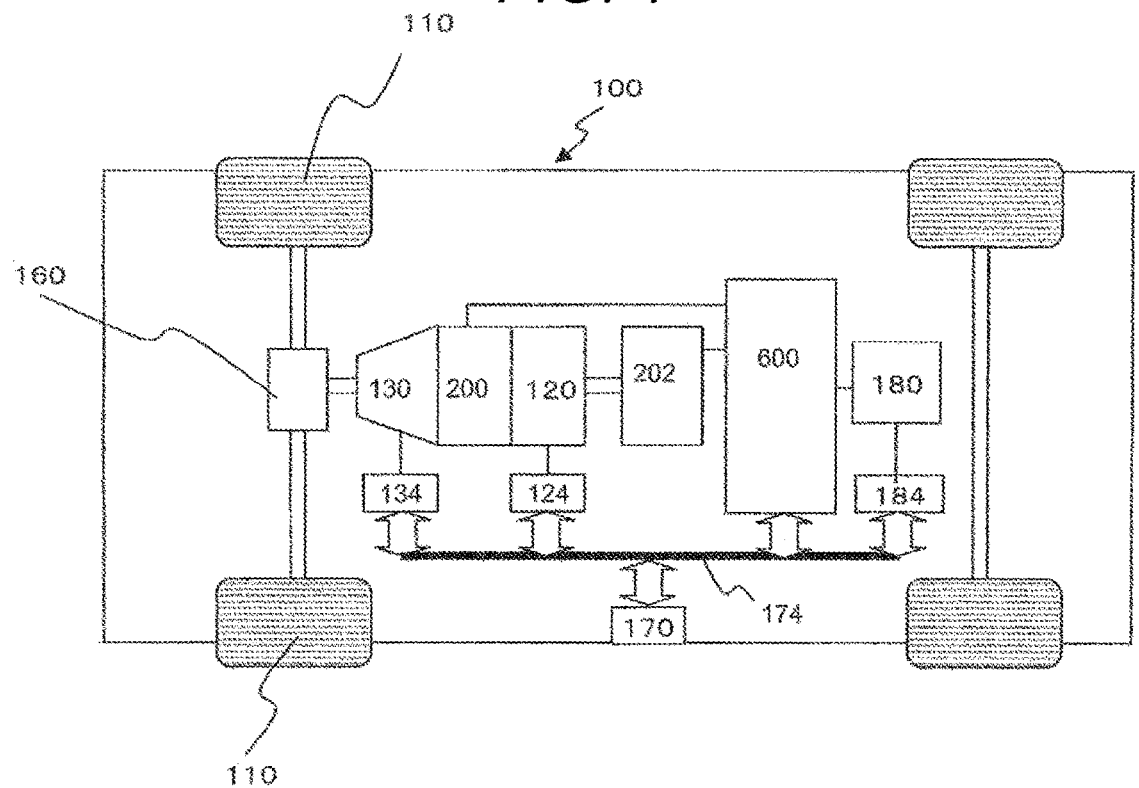
FIG. 1 is a schematic diagram of a hybrid electric vehicle incorporating a rotary electric machine according to the present embodiment.

FIG. 1 is a diagram illustrating a schematic configuration of a hybrid electric vehicle incorporating a rotary electric machine according to an embodiment of the present invention. A vehicle 100 includes an engine 120, a first rotary electric machine 200, a second rotary electric machine 202, and a battery 180. When a drive power generated by the first rotary electric machine 200 or the second rotary electric machine 202 is required, the battery 180 supplies DC power to the first rotary electric machine 200 or the second rotary electric machine 202 via a power converter 600. Furthermore, during regenerative running, the battery 180 receives DC power from the first rotary electric machine 200 or the second rotary electric machine 202. Transmission and reception of DC power between the battery 180 and the first rotary electric machine 200 or the second rotary electric machine 202 is performed via the power converter 600. Furthermore, although not illustrated, the vehicle includes a battery for supplying low voltage power (e.g., 14-volt power) to supply DC power to a control circuit, which is described below.

A rotation torque generated by the engine 120 and the first rotary electric machine 200 or the second rotary electric machine 202 is transmitted to front wheels 110 via a transmission 130 and a differential gear 160. The transmission 130 is controlled by a transmission control device 134, and the engine 120 is controlled by an engine control device 124. The battery 180 is controlled by a battery control device 184. The transmission control device 134, the engine control device 124, the battery control device 184, the power converter 600 and an integrated control device 170 are connected via a communication line 174.

The integrated control device 170 is a higher-level control device than the transmission control device 134, the engine control device 124, the power converter 600, and the battery control device 184, and receives information representing the states of the transmission control device 134, the engine control device 124, the power converter 600, and the battery control device 184, from the transmission control device 134, the engine control device 124, the power converter 600, and the battery control device 184, via the communication line 174. The integrated control device 170 calculates a control command for each of the control devices on the basis of the obtained information. The calculated control command is transmitted to each of the control devices via the communication line 174.

The voltage battery 180 having a high voltage includes a secondary battery, such as lithium-ion battery or nickel-hydrogen battery, and outputs DC power having a high voltage of 250 volts to 600 volts or more. The battery control device 184 outputs charge and discharge of the battery 180 or the states of unit cells constituting the battery 180 to the integrated control device 170, via the communication line 174.

When the integrated control device 170 determines that the battery 180 needs to be charged, on the basis of information from the battery control device 184, the integrated control device 170 instructs the power converter 600 to perform power generation operation. Furthermore, the integrated control device 170 mainly performs management of output torques of the engine 120, the first rotary electric machine 200, and the second rotary electric machine 202, and calculation of a total torque or a torque distribution ratio between the output torque of the engine 120 and the output torque of the first rotary electric machine 200 or the second rotary electric machine 202, and transmits a control command based on a result of the calculation to the transmission control device 134, the engine control device 124, and the power converter 600. On the basis of a torque command from the integrated control device 170, the power converter 600 controls the first rotary electric machine 200 or the second rotary electric machine 202 to output a torque or generate power in accordance with the command.

The power converter 600 is provided with a power semiconductor constituting an inverter circuit for operating the first rotary electric machine 200 or the second rotary electric machine 202. The power converter 600 controls switching operation of the power semiconductor on the basis of a command from the integrated control device 170. The switching operation of the power semiconductor operates the first rotary electric machine 200 or the second rotary electric machine 202 as an electric motor or a power generator.

When the first rotary electric machine 200 and the second rotary electric machine 202 are operated as the electric motor, DC power from the voltage battery 180 having a high voltage is supplied to a DC terminal of an inverter of the power converter 600. The power converter 600 converts DC power supplied by controlling the switching operation of the power semiconductor to three-phase AC power, and supplies the three-phase AC power to the first rotary electric machine 200 and the second rotary electric machine 202. In contrast, when the first rotary electric machine 200 and the second rotary electric machine 202 are operated as the power generator, rotors of the first rotary electric machine 200 and the second rotary electric machine 202 are rotatably driven by a rotation torque applied from outside, and three-phase AC power is generated in stator windings of the first rotary electric machine 200 and the second rotary electric machine 202. The generated three-phase AC power is converted to DC power by the power converter 600, and the DC power is supplied to the voltage battery 180 having a high voltage to charge the battery 180.

Figure 2:
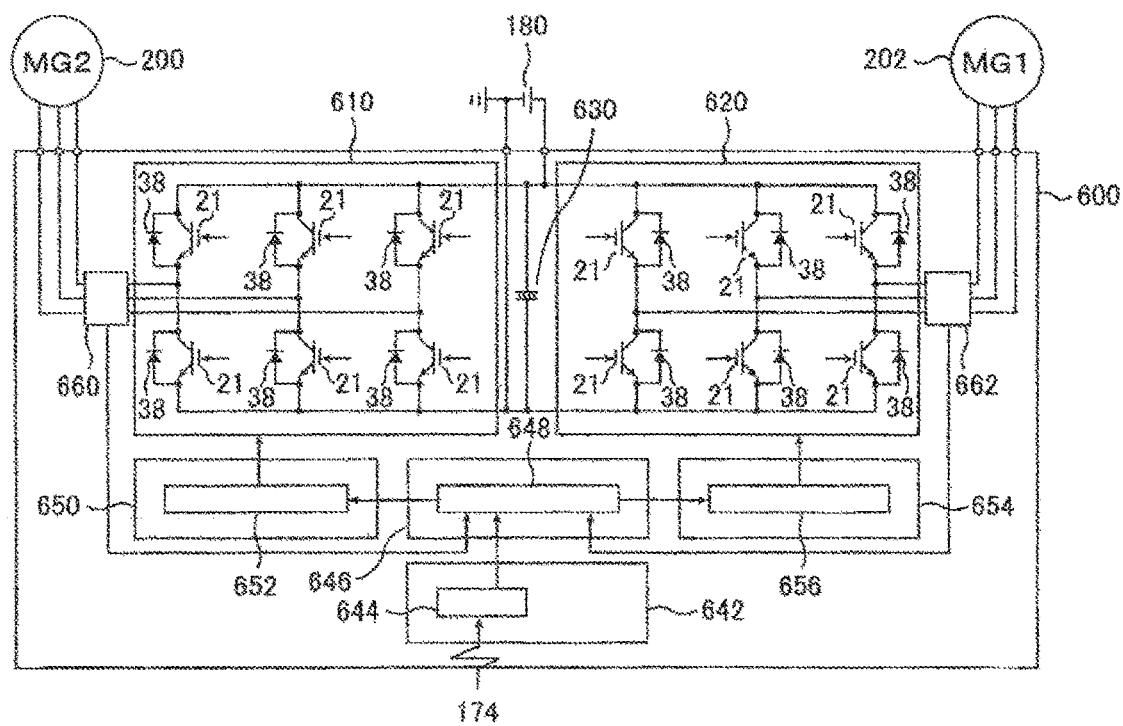
FIG. 2 is a circuit diagram of a power converter 600.

FIG. 2 is a circuit diagram of the power converter 600 of FIG. 1. The power converter 600 is provided with a first inverter device for the rotary electric machine 200, and a second inverter device for the rotary electric machine 202. The first inverter device includes a power module 610, a first drive circuit 652 for controlling switching operation of each power semiconductor 21 in the power module 610, and a current sensor 660 for detecting current of the first rotary electric machine 200. The first drive circuit 652 is provided on a drive circuit board 650.

In contrast, the second inverter device includes a power module 620, a second drive circuit 656 for controlling switching operation of each power semiconductor 21 in the power module 620, and a current sensor 662 for detecting current of the second rotary electric machine 202. The second drive circuit 656 is provided on a drive circuit board 654. The control circuit 648 provided on a control circuit board 646, a capacitor module 630, and a transmission/reception circuit 644 mounted on a connector board 642 are shared between the first inverter device and the second inverter device.

The power module 610 and the power module 620 are operated by drive signals output from the first drive circuit 652 and second drive circuit 656. The power module 610 and the power module 620 convert DC power supplied from the battery 180 to three-phase AC power, and supply the power to the stator windings being armature windings of the first rotary electric machine 200 and second rotary electric machine 202. Furthermore, the power modules 610 and 620 convert AC power induced by the stator windings of the first rotary electric machine 200 and the second rotary electric machine 202 to direct current, and supply the direct current to the battery 180.

The power module 610 and the power module 620 each include a three-phase bridge circuit as illustrated in FIG. 2, and series circuits corresponding to the three phases are electrically connected in parallel, between the positive electrode side and the negative electrode side of the battery 180. Each of the series circuits includes a power semiconductor 21 constituting an upper arm, and a power semiconductor 21 constituting a lower arm, and those power semiconductors 21 are connected in series. The power module 610 and the power module 620 have substantially the same circuit configuration as illustrated in FIG. 2, and the power module 610 will be representatively described herein.

In the present embodiment, an insulated gate bipolar transistor (IGBT) 21 is used as a switching power semiconductor element. The IGBT 21 includes three electrodes, that is, a collector electrode, an emitter electrode, and a gate electrode. Between the collector electrode and the emitter electrode of the IGBT 21, a diode is electrically connected. The diode 38 includes two electrodes, that is, a cathode electrode and an anode electrode, and the cathode electrode is electrically connected to the collector electrode of the IGBT 21 and the anode electrode is electrically connected to the emitter electrode of the IGBT 21 so that a direction from the emitter electrode to the collector electrode of the IGBT 21 is the forward direction.

Note that, as the switching power semiconductor element, a metal-oxide semiconductor field-effect transistor (MOSFET) may be employed. The MOSFET includes three electrodes, that is, a drain electrode, a source electrode, and a gate electrode. Since the MOSFET includes a parasitic diode between the source electrode and the drain electrode so that a direction from the drain electrode to the source electrode is the forward direction, and the diode 38 of FIG. 2 does not need to be provided.

Each phase arm is configured so that an emitter electrode of an IGBT 21 and a collector electrode of an IGBT 21 are electrically connected in series. Note that, in the present embodiment, although only one IGBT is illustrated for each of upper and lower phase arms, a plurality of IGBTs are actually electrically connected in parallel due to a large current capacity to be controlled. For ease of description, one power semiconductor is provided for each arm in the following description.

In an example of FIG. 2, each of the upper and lower phase arms includes three IGBTs. Each upper phase arm has a collector electrode of an IGBT 21 electrically connected to the positive electrode of the battery 180, and each lower arm has a source electrode of an IGBT 21 electrically connected to the negative electrode of the battery 180. Each phase arm has a midpoint (a connecting portion between an emitter electrode of an IGBT of an upper arm and a collector electrode of an IGBT of a lower arm) which is electrically connected to armature windings (stator winding) of corresponding phase of the first rotary electric machine 200 or the second rotary electric machine 202.

The first drive circuit 652 and the second drive circuit 656 constitute drive units for controlling the power module 610 and power module 620, and generate drive signals for driving the IGBTs 21 on the basis of control signals output from the control circuit 648. The drive signals generated in the first drive circuit 652 and the second drive circuit 656 are output to the gates of the power semiconductor elements of the power module 610 and the power module 620. Each of the first drive circuit 652 and the second drive circuit 656 is provided with six integrated circuits for generating drive signals supplied to gates of the upper and lower phase arms, respectively, and the six integrated circuits constitutes one block.

The control circuit 648 constitutes a control unit for the power module 610 and the power module 620, and includes a microcomputer for calculating control signals (controlling values) for operating (turning on/off) a plurality of switching power semiconductor elements. The control circuit 648 receives input of a torque command signal (torque command value) from a higher-level control device, sensor outputs from the current sensor 660 and the current sensor 662, and sensor outputs from rotation sensors incorporated in the first rotary electric machine 200 and the second rotary electric machine 202. The control circuit 648 calculates controlling values on the basis of the input signals, and outputs control signals for controlling switching timing to the first drive circuit 652 and the second drive circuit 656.

The transmission/reception circuit 644 mounted on the connector board 642 is used to electrically connect the power converter 600 to an external control device, and transmits and receives information to and from another device via the communication line 174 of FIG. 1. The capacitor module 630 constitutes a smoothing circuit for controlling a variation in DC voltage caused by switching operation of an IGBT 21, and the capacitor module 630 is electrically connected in parallel to a DC terminal in the power module 610 or the power module 620.

Figure 3:
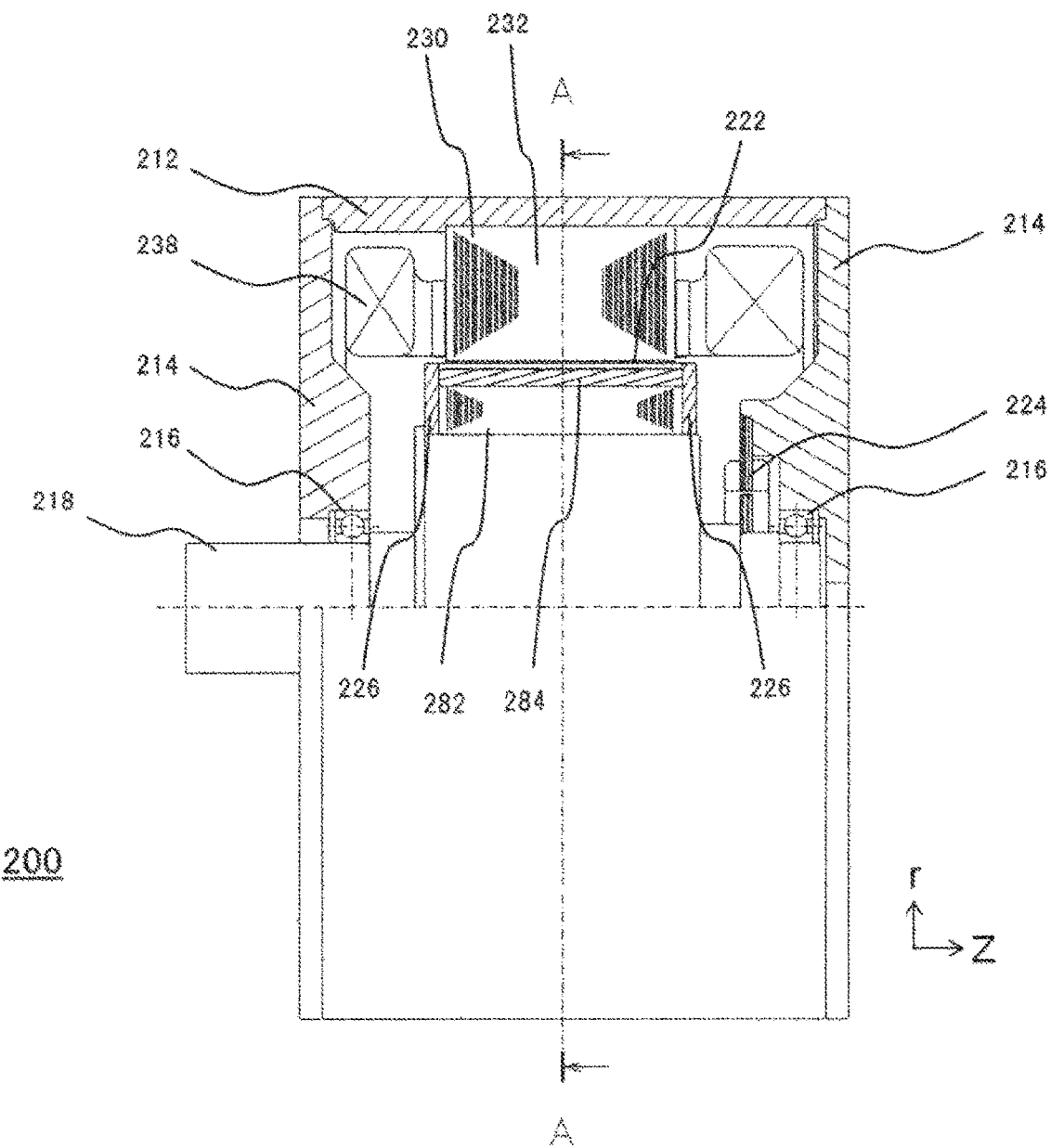
FIG. 3 is a cross-sectional view of the rotary electric machine according to the present embodiment.

FIG. 3 is a cross-sectional view of the first rotary electric machine 200 of FIG. 1 taken along an r-Z plane. Note that the first rotary electric machine 200 and the second rotary electric machine 202 have substantially the same structure, and the structure of the first rotary electric machine 200 will be representatively described below. However, the following structure is not necessarily adopted for both of the first rotary electric machine 200 and the second rotary electric machine 202, and may be adopted for only one of the first rotary electric machine 200 and the second rotary electric machine 202.

A housing 212 accommodates a stator 230. The stator 230 includes a stator core 232 and the stator windings 238. The stator core 232 has an inner peripheral side on which the rotor 280 (see FIG. 4) is rotatably held via an air gap 222. The rotor 280 includes a rotor core 282 fixed to a shaft 218, a permanent magnet 284, and a non-magnetic wear plate 226. The housing 212 includes a pair of end brackets 214 each provided with a bearing 216, and the shaft 218 is rotatably held by the bearings 216.

The shaft 218 is provided with a resolver 224 for detecting the positions or rotation rate of the poles of the rotor 280. Outputs from the resolver 224 are captured by the control circuit 648 illustrated in FIG. 2. The control circuit 648 outputs a control signal to the first drive circuit 652, on the basis of the captured outputs. The first drive circuit 652 outputs a drive signal to the power module 610, on the basis of the control signal. The power module 610 performs switching operation on the basis of the control signal, and converts DC power supplied from the battery 180 to three-phase AC power. The three-phase AC power is supplied to the stator windings 238 illustrated in FIG. 3, and a rotating magnetic field is generated in the stator 230. Three-phase AC currents have a frequency controlled on the basis of output values from the resolver 224, and the phases of the three-phase AC currents relative to the rotor 280 are also controlled on the basis of the output values from the resolver 224.

Figure 4:
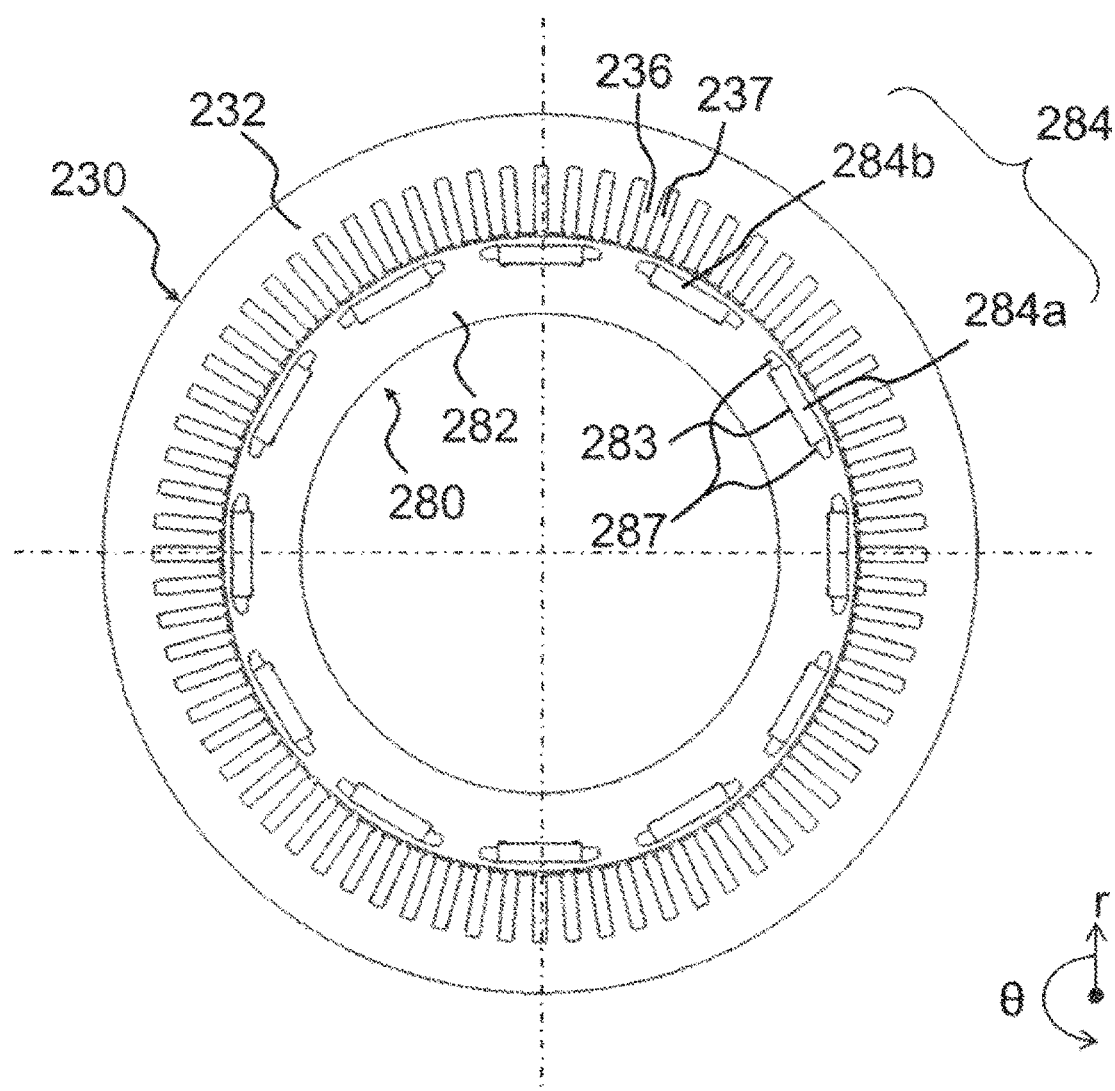
FIG. 4 is a cross-sectional view of a stator 230 and a rotor 250 according to the present embodiment taken along an r-θ plane.

FIG. 4 is a cross-sectional view of the stator 230 and the rotor 280 taken along an r-θ plane, and is a cross-sectional view taken along the line A-A of FIG. 3.

Note that, in FIG. 4, illustration of the housing 212, the shaft 218, and the stator winding 238 is omitted. The stator core 232 has an inner peripheral side on which a large number of slots 237 and teeth 236 are uniformly arranged over the whole periphery. In FIG. 4, not all the slots and teeth are denoted by reference signs, but only part of the teeth and slots are representatively denoted by reference signs.

In the slots 237, a slot insulating material (not illustrated) is provided, and a plurality of phase windings of U-phase, V-phase, and W-phase constituting the stator windings 238 of FIG. 3 is arranged. In the present embodiment, the number of slots per pole and phase is two, and 72 slots 237 are formed at equal intervals. The number of slots per pole and phase represents the phases arranged so that two U phases, V phases, and W phases are adjacently arranged in the slots 237 in a θ-direction, such as U phase, U phase, V phase, V phase, W phase, W phase, . . . , and U phase, V phase, and W phase use six slots 237 per pole. The present embodiment employs 12 poles in which 12 permanent magnets 284, described later, are arranged in the θ-direction, and the number of slots 237 of the stator core 232 is 6×12=72.

In the vicinities of the outer periphery of the rotor core 282, 12 holes 283 for insertion of rectangular magnets are arranged at equal intervals in the θ-direction. The holes 283 are formed in a z-direction, and the permanent magnets 284 are embedded in the holes 283 and fixed with an adhesive or the like. The width of a hole 283 in the θ-direction is set larger than the width of a permanent magnet 284 (284a, 284b) in the θ-direction, and hole spaces 287 on both sides of the permanent magnet 284 functions as a magnetic air gap. The hole space 287 may be filled with an adhesive or may be filled with a molding resin hardening with the permanent magnet 284. The permanent magnet 284 functions as a field pole of the rotor 280, and the present embodiment employs 12 poles.

The magnetization direction of the permanent magnet 284 is oriented in a radial direction, and the magnetization direction is reversed alternately in the field poles. That is, when a permanent magnet 284a has a stator side surface being N pole and a shaft side surface being S pole, an adjacent permanent magnet 284b has a stator side surface being S pole and a shaft side surface being N pole. These permanent magnets 284a and permanent magnets 284b are alternately arranged in the θ-direction.

The permanent magnet 284 may be inserted into the hole 283 after being magnetized, or may be magnetized by a strong magnetic field after being inserted into the hole 283 of the rotor core 282. However, the magnetized permanent magnet 284 is a strong magnet. Therefore, the permanent magnet 284 magnetized before being fixed to the rotor 280 generates a strong attraction force between the permanent magnet 284 and the rotor core 282 when being fixed to the rotor core 282, and assembly is inhibited. Furthermore, the strong attraction force of the permanent magnet 284 may attract dust, such as iron powder, to the permanent magnet 284. Therefore, when considering the productivity of the rotary electric machine, the permanent magnet 284 is preferably magnetized after being inserted into the rotor core 282.

Note that the permanent magnet 284 can use neodymium- or samarium-based sintered magnet, ferrite magnet, neodymium-based bonded magnet, or the like. The permanent magnet 284 has a remanence of approximately 0.4 to 1.4 T.

When three-phase AC currents are applied to the stator windings 238, generating rotating magnetic fields in the stator 230, the rotating magnetic fields act on the permanent magnets 284a and the permanent magnets 284b of the rotor 280 to generate a torque. The torque is expressed as the product of a component interlinking with each phase winding of magnetic fluxes output from a permanent magnet 284 and a component perpendicular to an interlinkage flux of AC current flowing in each phase winding. Here, since the AC current is controlled to have a sine waveform, the product of a fundamental wave component of the interlinkage flux and a fundamental wave component of the AC current is a time-averaged component of the torque, and the product of a harmonic component of the interlinkage flux and a fundamental wave component of the AC current is torque ripple being a harmonic component of the torque. That is, to reduce the torque ripple, the harmonic component of the interlinkage flux is desirably reduced. In other words, the product of the interlinkage flux and the angular velocity of rotation of the rotor is an induced voltage, and to reduce the harmonic component of the interlinkage flux is to reduce the harmonic component of an induced voltage.

Figure 5:
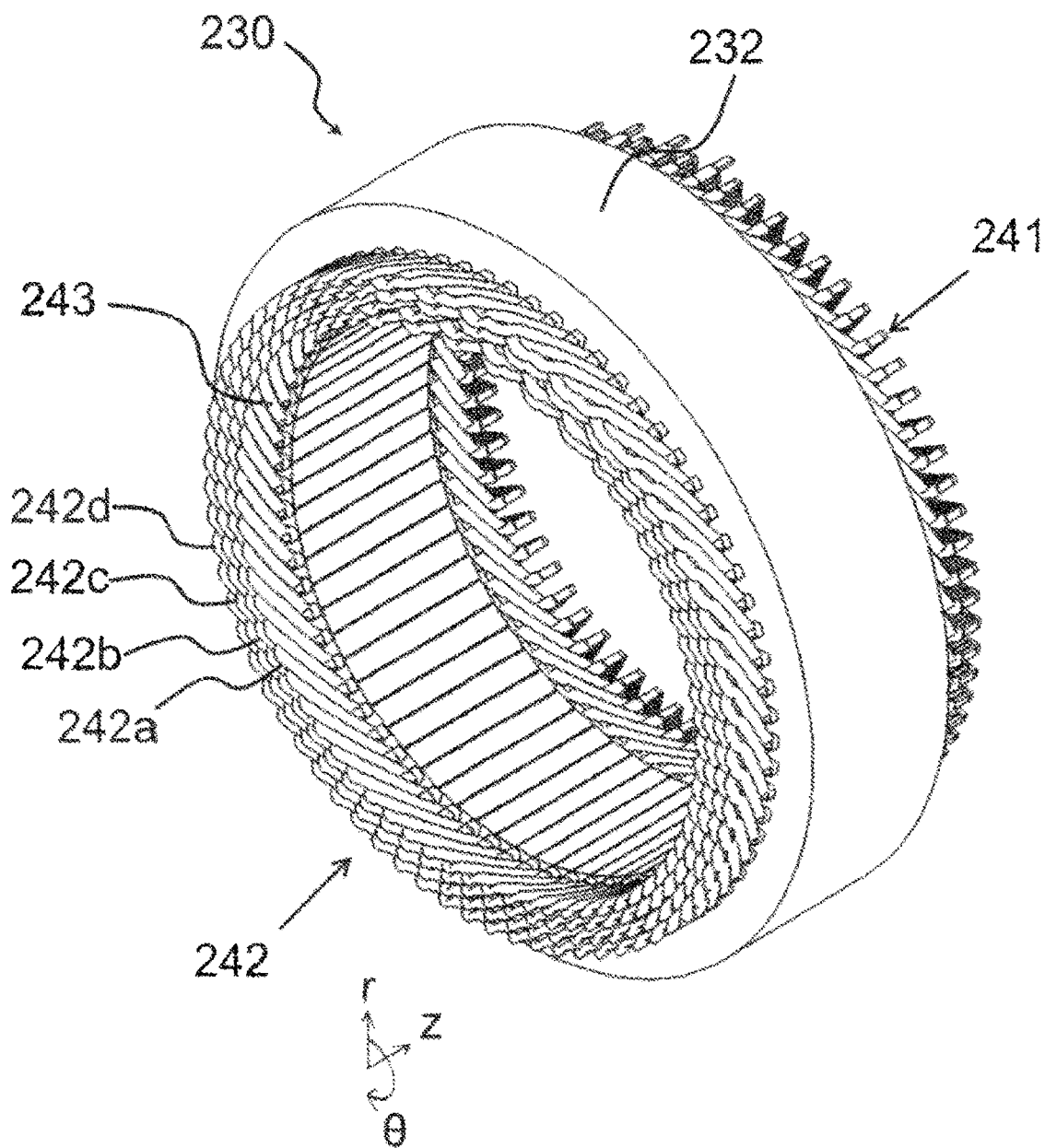
FIG. 5 is a perspective view of the stator 230 according to the present embodiment, as viewed from a non-connection side coil end 242.

FIG. 5 is a perspective view of the stator 230. In the present embodiment, a plurality of segment coils 243 of substantially U-shape is used for the stator core 232 to form the stator windings 238 by wave winding for winding the segment coils 243 into a waveform. The stator core 232 has both end surfaces including a connection-side coil end 241 formed to connect terminal portions of a segment coil 243, and a non-connection side coil end 242 formed by a portion being a U-shaped bottom of the segment coil 243, respectively.

In the present embodiment, 72 segment coils 243 are inserted into the 72 slots 237 and circumferentially aligned. Furthermore, when the circumferentially inserted 72 segment coils 243 are formed into one winding group, the present embodiment includes four winding groups, that is, a first winding group 242a, a second winding group 242b, a third winding group 242c, and a fourth winding group 242d, as viewed from an innermost periphery of the stator core 232.

FIG. 6 is an enlarged schematic cross-sectional view of one slot of the stator 230 taken along an r-θ plane, and is a simplified schematic view from which the slot insulating material provided between the stator core 232 and the segment coils 243 is omitted. As illustrated in FIG. 6, the segment coils 243 are arranged in the stator core 232 to form a plurality of layers. In the present embodiment, the plurality of layers consists of a layer 1 to a layer 8 sequentially arranged in an r-direction from the inner peripheral side (lower portion in FIG. 6). The non-connection side coil end 242 includes the four winding groups, and the first winding group 242a is inserted into the layer 1 and the layer 2, the second winding group 242b is inserted into the layer 3 and the layer 4, the third winding group 242c is inserted into the layer 5 and the layer 6, and the fourth winding group 242d is inserted into the layer 7 and the 8 layer. In the present embodiment, a segment coil having a square cross-section is employed, but a segment coil having a circular cross-section may be employed.

Figure 7A:
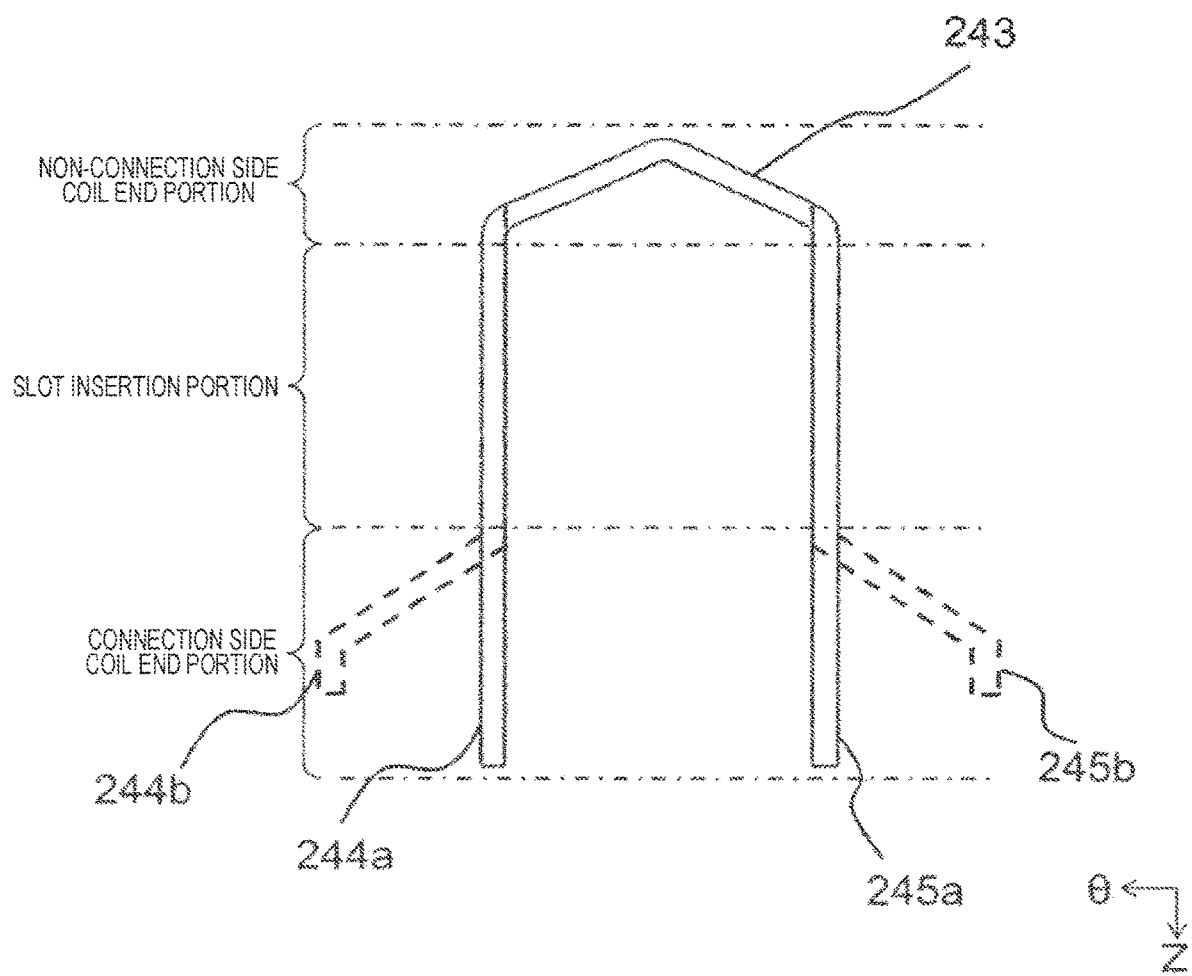
FIG. 7A is a diagram of a segment coil 243 before being assembled to a stator core 232 according to the present embodiment, as viewed from the inner peripheral side of the stator core.

FIG. 7(a) is a diagram of the segment coil 243 before being assembled to a stator core 232, as viewed from the inner peripheral side of the stator core 232. The cross-sectional view taken along the r-θ plane of FIG. 6 is a cross-sectional view of a portion corresponding to an insertion portion of the slot 237 illustrated in FIG. 7(a).

The segment coil 243 has a substantially U-shape, and, for example, has a terminal portion 244a having a shape to be inserted into the layer 1, and a terminal portion 245a having a shape to be inserted into the layer 2 in the first winding group 242a. After the segment coil 243 is inserted into the stator core 232, the terminal portion 244a inserted into the layer 1 is twisted leftward in the θ-direction like a terminal portion 244b represented by a broken line, and the terminal portion 245a inserted into the layer 2 is twisted rightward in the θ-direction like a terminal portion 245b represented by a broken line.

Figure 7B:
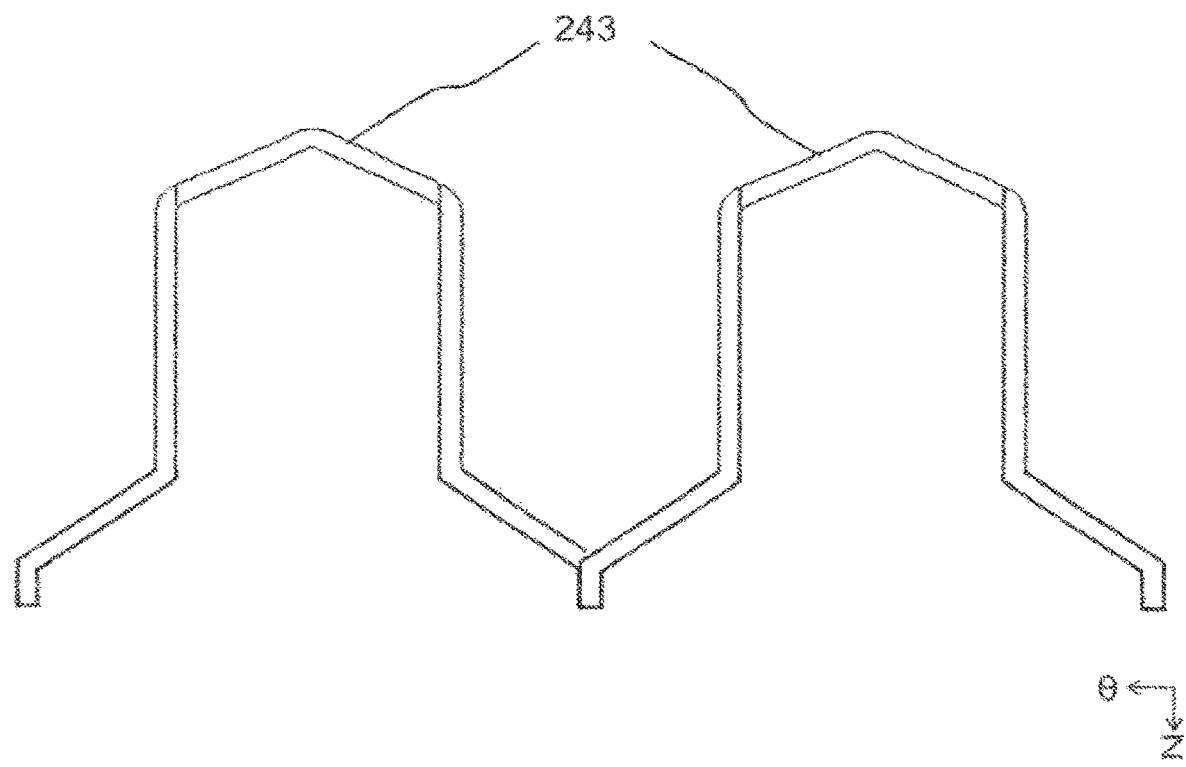
FIG. 7B is a diagram of the segment coils according to the present embodiment in which twisted terminal portions 244b and twisted terminal portions 245b are arranged to be aligned in an r-direction.

As illustrated in FIG. 7(b), when the twisted terminal portions 244b and the twisted terminal portions 245b are arranged to be aligned in the r-direction (244b into the layer 1, 245b into the layer 2), wave winding having a waveform is formed in the θ-direction. Similarly, in the second winding group, the terminal portion 244a is inserted into the layer 3, and the terminal portion 245a is inserted into the layer 4, in the third winding group, the terminal portion 244a is inserted into the layer 5, and the terminal portion 245a is inserted into the layer 6, and in the fourth winding group, the terminal portion 244a is inserted into the layer 7, and the terminal portion 245a is inserted into the layer 8. An odd-numbered layer is twisted like the terminal portion 244b, and an even-numbered layer is twisted like the terminal portion 245b. The terminal portion 244a inserted into the odd-numbered layer and the terminal portion 245a inserted into the even-numbered layer may be revered.

Figure 8:
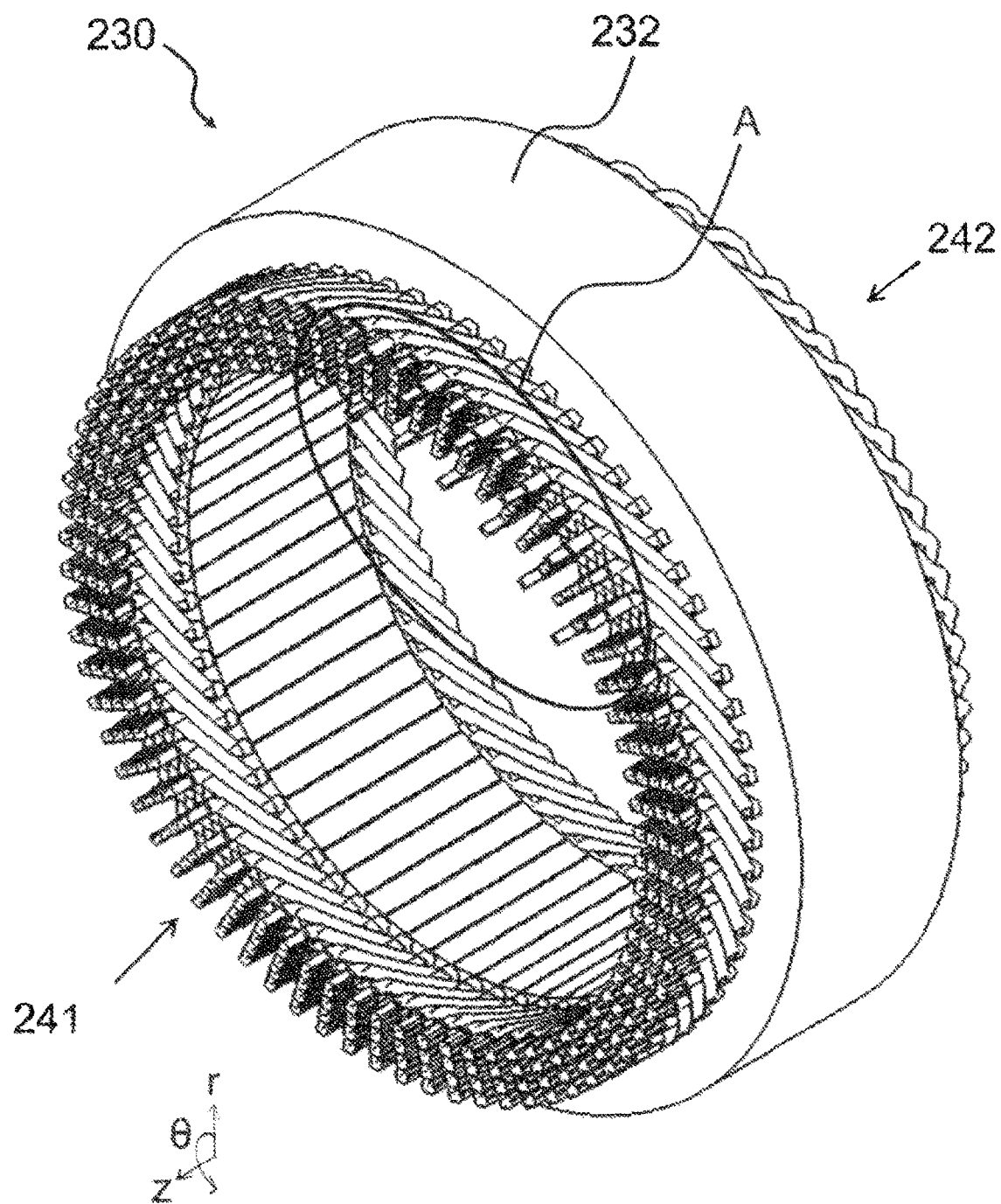
FIG. 8 is a perspective view of the stator 230 according to the present embodiment, as viewed from a connection-side coil end 241.

FIG. 8 is a perspective view of the stator 230, as viewed from the connection-side coil end 241. As described above, the segment coils 243 having been inserted from the side of the non-connection side coil end 242 are twisted with the same slot pitch in each layer. In the present embodiment, each layer is twisted with a three slot pitch, and in FIG. 8, the odd-numbered layer, such as the layer 1, the layer 3, the layer 5, or the layer 7, is twisted clockwise, and the even-numbered layer, such as the layer 2, the layer 4, the layer 6, or the layer 8, is twisted counterclockwise. The terminal portions 244b and 245b of the segment coils 243 of each layer are configured to be connected with a six slot pitch.

In the present embodiment, twisting is performed by dividing six slot pitches into three slot pitches in each layer, but, for example, when the odd-numbered layer, such as the layer 1, the layer 3, the layer 5, or the layer 7 is twisted with a 2 slot pitch, and the even-numbered layer, such as the layer 2, the layer 4, the layer 6, or the layer 8 is twisted with a four slot pitch to have a total of six slot pitches, all the layers do not need to have the same slot pitch. However, after twisting, to connect the terminal portions 244b and the terminal portions 245b of the segment coils 243, the terminal portions 244b and the terminal portions 245b desirably have a slot pitch with which the terminal portions 244b and the terminal portions 245b are aligned in line in the r-direction.

Figure 9:
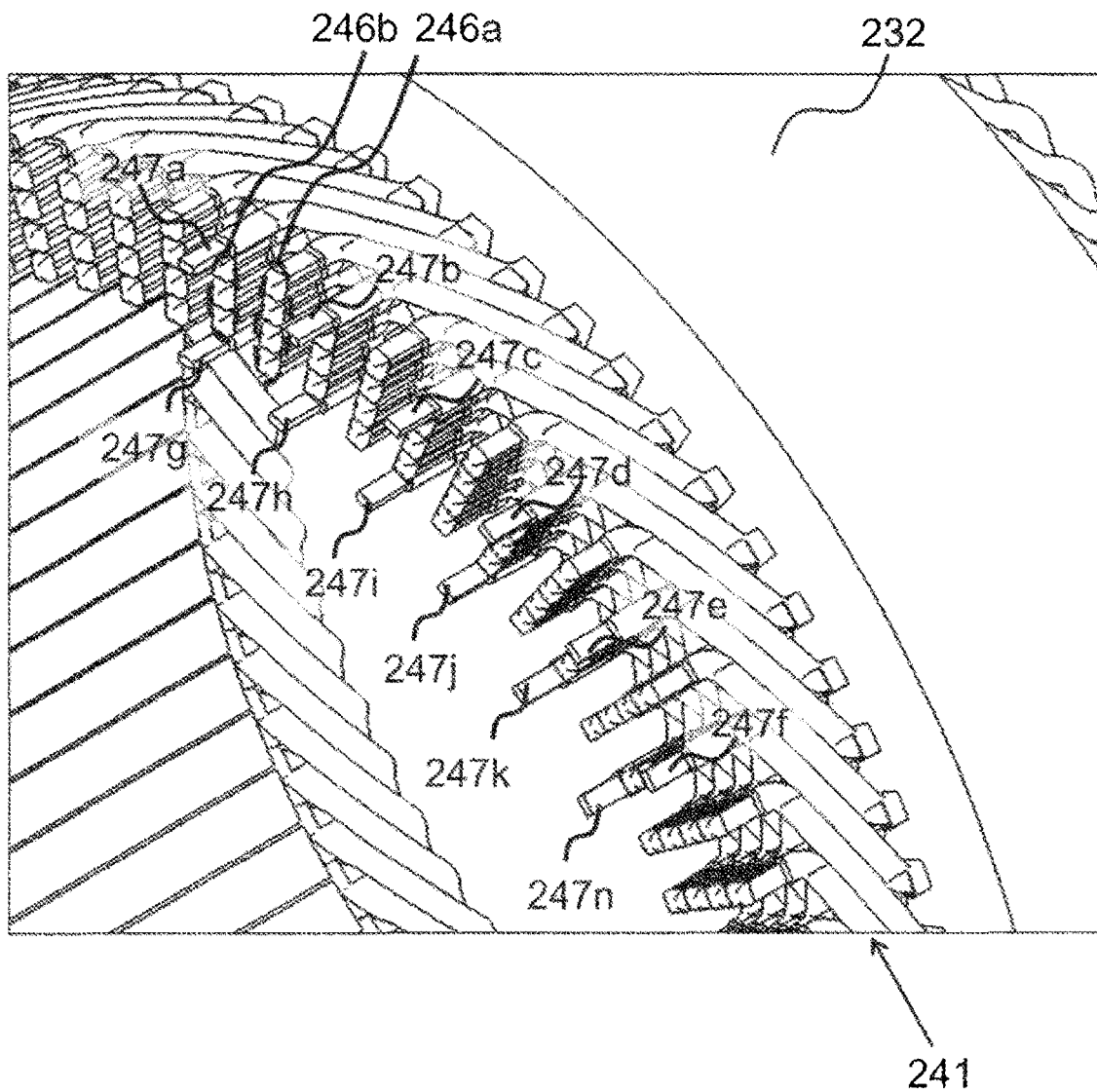
FIG. 9 is an enlarged view of a range A illustrated in FIG. 8.

FIG. 9 is an enlarged view of a range A illustrated in FIG. 8. At terminal portions other than U-phase, V-phase, and W-phase terminal portions connected to the current sensor 660 and terminal portions being neutral points, a first connection group 246a is constituted in which 2n−1 layers and 2n layers, such as the layer 1 and the layer 2, the layer 3 and the layer 4, the layer 5 and the layer 6, and the layer 7 and the layer 8, are connected to each other, and the four connected points are connected to be aligned in a radial direction. This connection allows electrical connection in each winding group.

At a portion near a U-phase, V-phase, or W-phase terminal portion connected to the current sensor 660 and a terminal portion being a neutral point, a second connection group 246b is constituted in which 2n layers and 2n+1 layers, such as the layer 2 and the layer 3, the layer 4 and the layer 5, and the layer 6 and the layer 7, are connected to each other, and the three connection points are aligned in a radial direction. The remaining layer 1 and layer 8 are the U phase, V phase, or W phase connected to the current sensor 660, and the neutral point. Owing to this connection, the independent winding groups are electrically connected, and further connected to the current sensor 660.

Since the present embodiment employs double star connections, terminal portions of U-phase, V-phase, or W-phase connected to the current sensor 660 have two lead wires, such as a U1-phase lead wire 247a and a U2-phase lead wire 247j, a V1-phase lead wire 247c and a V2 phase lead wire 247n, or a W1-phase lead wire 247h and a W2-phase lead wire 247e, and the respective wires have one neutral point for forming the star connections, such as a U1-phase neutral point 247g, a U2-phase neutral point 247d, a V1-phase neutral point 247i, a V2-phase neutral point 247f, a W1-phase neutral point 247b, and a W2-phase neutral point 247k, and a total of 12 lead wires are drawn.

FIG. 9 illustrates a state in which the lead wires are not connected to each other. Connection to the current sensor 660 can be drawn to a desired portion by using another member later. For example, connection can be performed by various methods, such as a connection method for routing a conductive wire of another member or a connection method using a connection board.

Figure 10:
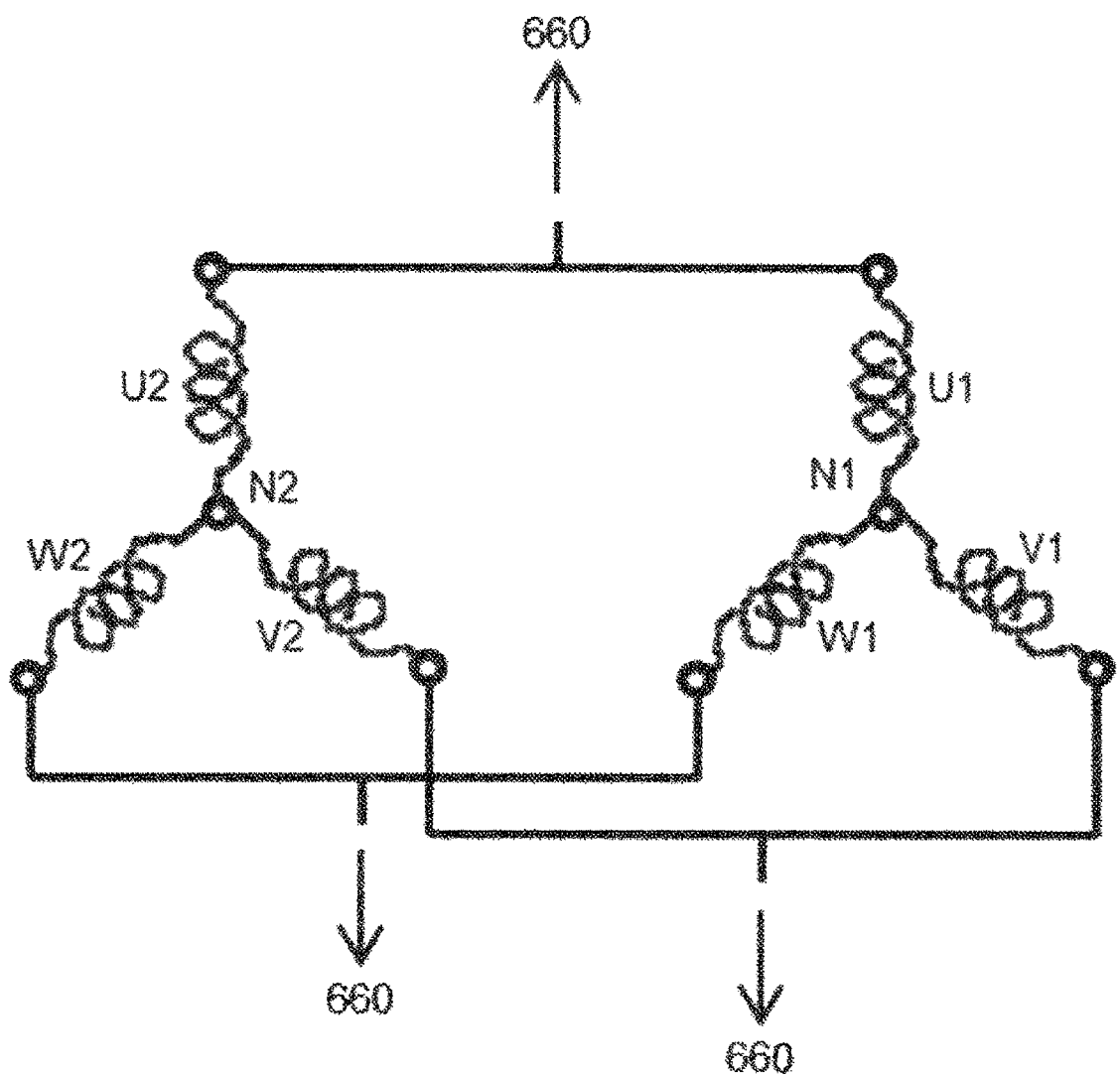
FIG. 10 is a connection diagram of stator windings 238 according to the present embodiment.

FIG. 10 is a connection diagram of the stator windings 238, and illustrates a connection method and an electrical phase relationship between the respective phase windings. As described above, the double star connections are adopted for the stator windings 238 according to the present embodiment, and a first star connection including a U1-phase winding group, a V1-phase winding group, and a W1-phase winding group and a second star connection including a U2-phase winding group, a V2 phase winding group, and a W2-phase winding group are connected in parallel.

As illustrated in FIG. 10, in the first star connection and the second star connection, the U phases (the U1-phase lead wire 247a and the U2-phase lead wire 247j in FIG. 9), the V phases (the V1-phase lead wire 247c and the V2 phase lead wire 247n in FIG. 9), or the W phases (the W1-phase lead wire 247h and the W2-phase lead wire 247e) are electrically connected to each other, and the connection portions are connected to the current sensor 660.

Furthermore, in each star connection, U1, V1, and W1 are connected to a neutral point N1 (the U1-phase neutral point 247g, the V1-phase neutral point 247i, and the W1-phase neutral point 247b in FIG. 9), and U2, V2, and W2 are connected to a neutral point N2 (the U2-phase neutral point 247d, the V2-phase neutral point 247f, and the W2-phase neutral point 247k in FIG. 9) and the U1, V1, and W1 and the U2, V2, and W2 are electrically connected to each other. In FIG. 10, the neutral point N1 and the neutral point N2 are not connected to each other, but the neutral point N1 and the neutral point N2 may be connected to each other.

As illustrated in FIG. 10, the configurations of the V phase and W phase are substantially the same as the configuration of the U phase, and the U phase, V phase, and W phase are arranged to offset the phases of voltage induced by the U phase, the V phase, and the W phase by 120 degrees in electric angle. In the present embodiment, the double star (2Y) connections connected in parallel is employed for the stator windings 238, but, depending on a drive voltage of a rotary electric machine, the double star connections may be connected in series to provide single star (1Y) connection.

Figure 11:
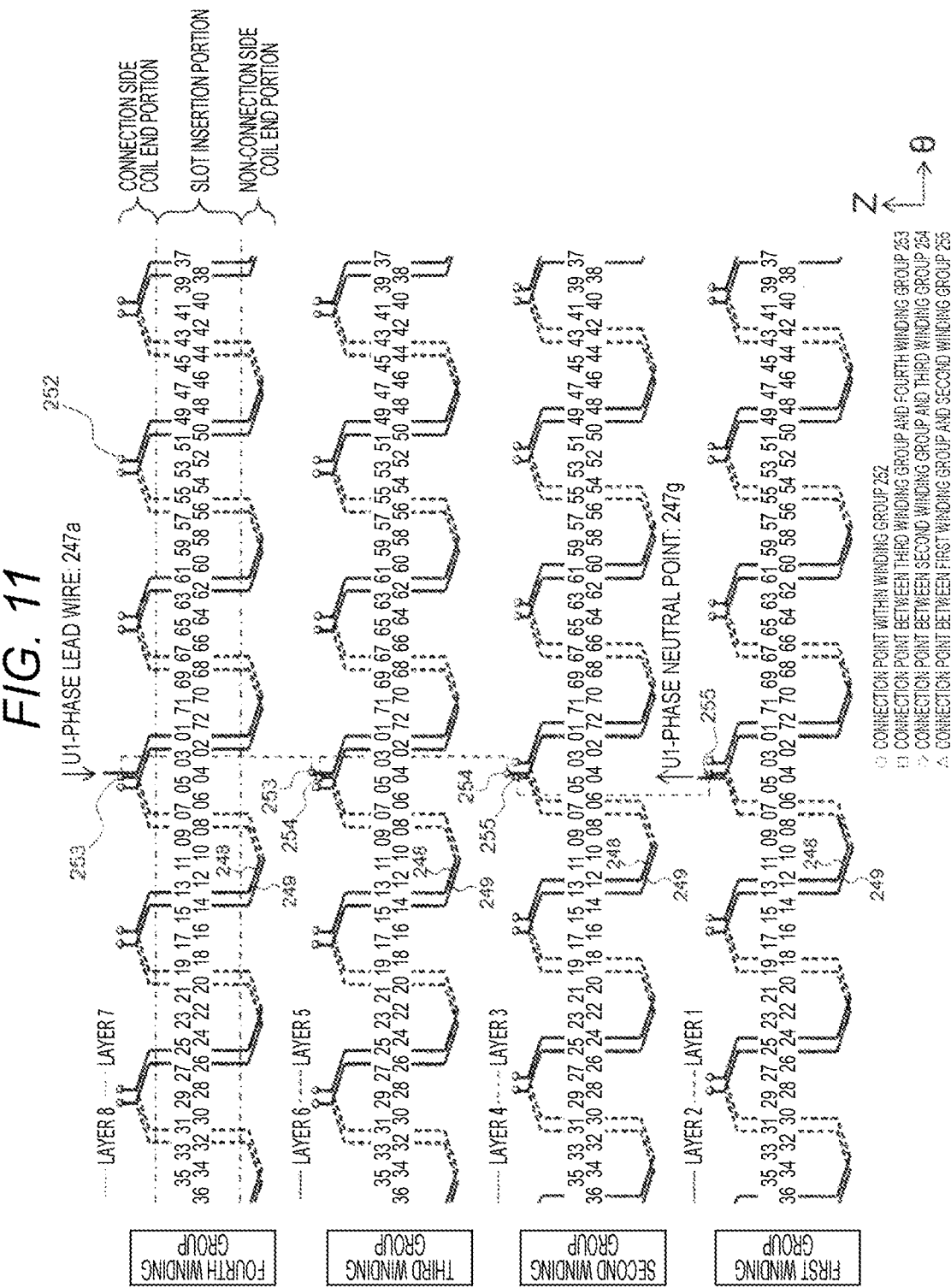
FIG. 11 is a detailed connection diagram of U1 of FIG. 10.

FIG. 11 is a detailed connection diagram of U1 of FIG. 10, as viewed from the inner peripheral side of the stator core 232. As described above, 72 slots 237 are formed in the stator core 232 (see FIG. 4), and numerals 01, 02, . . . 71, and 72 in FIG. 11 represent slot numbers. In each winding group, a portion above the slot numbers corresponds to the connection-side coil end 241, and a portion below the slot numbers corresponds to the non-connection side coil end 242. When winding is started from the U1-phase lead wire 247*a* through which current flows via the current sensor 660 of FIG. 10, firstly, a segment coil of the layer 8 of the fourth winding group (U1-phase lead wire 247*a*) is inserted (slot number 01) and wound rightward (θ-direction) in FIG. 11.

In FIG. 11, when winding from a connection point 252 within a winding group to a next connection point 252 within a winding group, which are represented by a circle (○ in symbol), is defined as one turn, a winding is wound five turns with a six slot pitch in the connection-side coil end 241, and with a six slot pitch in the non-connection side coil end 242, and then a segment coil 248 spanning five slot pitches, smaller by one slot pitch, only in the non-connection side coil end 242 is wound one turn so that the number of slots per pole and phase is two. Then, the segment coil 248 is inserted into slot number 02 positioned next to the segment coil inserted into the first slot number 01, and the number of slots per pole and phase is two.

After the winding is wound with a six slot pitch, five turns again, a segment coil 249 spanning seven slot pitches, larger by one slot pitch, only in the non-connection side coil end 242 is wound one turn, and a terminal portion of the segment coil 249 spanning seven slot pitches is drawn from the layer 7 at slot number 01. The layer 7 is a layer adjacent to the layer from which the winding is started, toward the inner peripheral side. Here, the fourth winding group of U1 is completed, and the terminal portion of the segment coil of the layer 7 is connected to a segment coil (a connection point 253 represented by square in FIG. 11 (□ in symbol)) drawn from the layer 6 of the third winding group, which is a layer adjacent to the layer 7 toward the inner peripheral side.

Likewise, in the third winding group, after a segment coil spanning six slot pitches is wound five turns, rightward (θ-direction) in FIG. 11, in any of the connection-side coil end 241 and the non-connection side coil end 242, the segment coil 248 spanning five slot pitches only in the non-connection side coil end 242 is wound one turn, a segment coil spanning six slot pitches is wound five turns again, the segment coil 249 spanning seven slot pitches in the non-connection side coil end 242 is wound one turn, and a terminal portion of the segment coil 249 spanning seven slot pitches is drawn from the layer 5 at slot number 01. The layer 5 is a layer adjacent to the layer of the third winding group from which the winding is started, toward the inner peripheral side. Here, the third winding group of U1 is completed, and the terminal portion of the segment coil of the layer 5 is connected to a segment coil (a connection point 254 represented by rhombus in FIG. 11 (◇ in symbol)) drawn from the layer 4 of the second winding group, which is a layer adjacent to the layer 5 toward the inner peripheral side.

The second winding group wound in a similar manner is connected to the first winding group at a connection point 255 represented by triangle (Δ in symbol), the first winding group is wound in a similar manner, the U1-phase neutral point 247*g* is drawn from the first winding group of FIG. 11, and the U1-phase winding group is completed. As illustrated in FIG. 11, in each winding group, the non-connection side coil ends 242 have three kinds of slot pitches, but the connection side coil end portions have a six-slot pitch only. Therefore, the connection point 252 within a winding group represented by ○ are aligned in an r-direction and correspond to the first connection group 246*a* illustrated in FIG. 9.

Furthermore, the connection point 253, the connection point 254, and the connection point 255 connecting the winding groups represented by □, ◇, and Δ, respectively, are also aligned in an r-direction, and the terminal portions drawn from the layer 1 and the layer 8 serve as the U1-phase lead wire 247*a* and the U1-phase neutral point 247*g* and correspond to the second connection group 246*b* illustrated in FIG. 9. FIG. 11 is a detailed connection diagram of U1, but U2, V1, V2, W1, and W2 have the same configuration although slots 237 for insertion are different.

As seen from this connection, when the number of slots per pole and phase is two or more, a plurality of slot pitches is required for any of the connection-side coil end 241 and the non-connection side coil end 242, but, as described in the present embodiment, coils are arranged with a plurality of slot pitches v the non-connection side coil end 242, that is, an untwisted segment coil is employed to have a plurality of slot pitches. Thus, the connection-side coil end 241 can have the same slot pitch, enabling a twisting process at once, facilitating the process. In the present embodiment, the configuration includes the first winding group to the fourth winding group, but at least two winding groups can provide the same configuration as that of the present invention.

The present embodiment provides the connection in which in one winding group of U1, a winding is wound five turns with a six slot pitch, and further wound with a five slot pitch and a seven slot pitch in every other turn so that the number of slots per pole and phase is two in the non-connection side coil end 242, and all windings in the connection-side coil end 241 are wound with a six slot pitch, but, the following connection can also provide the configuration according to the present invention, in which, for example, a winding is wound five turns with a seven slot pitch, and further wound with a six slot pitch and an eight slot pitch in every other turn so that the number of slots per pole and phase is two in the non-connection side coil end 242, and all windings in the connection-side coil end 241 are wound with a five slot pitch. In the present embodiment, the number of slots per pole and phase is two, but as long as the number of slots per pole and phase is two or more, the same configuration can be provided. For example, when the number of slots per pole and phase is three, the segment coil 248 spanning five slot pitches is wound two turns in each winding group, and further the segment coil 249 spanning seven slot pitches in the last turn in the winding group is formed into a segment coil spanning eight slot pitches to be returned to the same slot number from which the winding is started, and the same configuration is provided.

In the present embodiment, when considering both of the U1-phase and the U2-phase, the segment coils are arranged so that segment coils in the layer 1 to the layer 4 are inserted into slot numbers 01 and 72, and segment coils in the layer 5 to the layer 8 are inserted into the slot numbers 02 and 01, but, for example, when connection points at which the second winding group and the third winding group are connected are adjusted, full-pitch winding in which the segment coils are inserted into slot numbers 01 and 72 in the layer 1 to the layer 8 can be provided.

Figure 12:
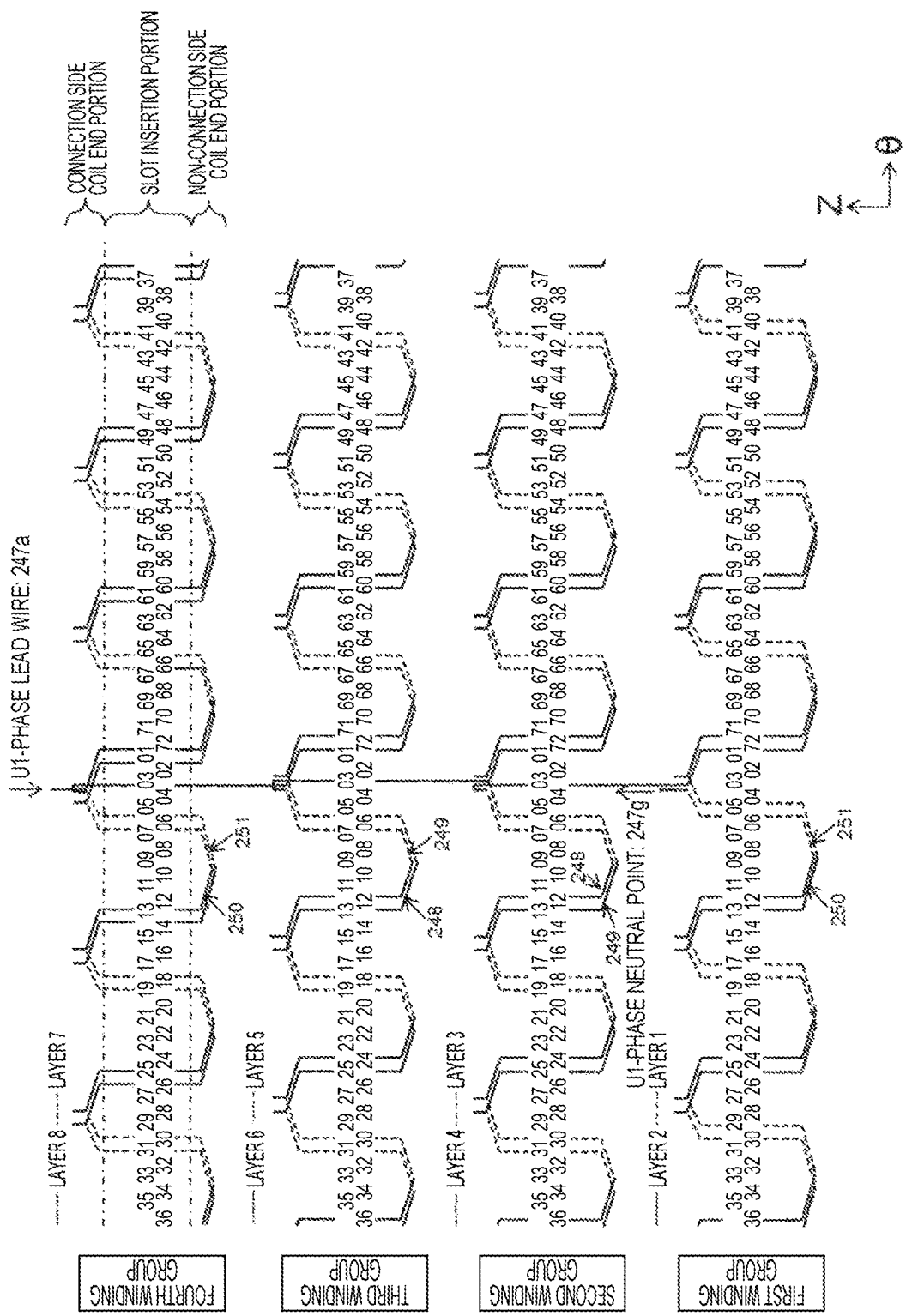
FIG. 12 is a detailed connection diagram of U1 having a combination different from that of FIG. 11.

FIG. 12 is a detailed connection diagram of U1 having a combination different from that of FIG. 11. FIG. 11 illustrates slot pitches of the segment coils in the first winding group to the fourth winding group, in which all windings in the connection-side coil end 241 are wound with a six slot pitch, and windings in the non-connection side coil end 242 are wound with five, six, and seven slot pitches, but FIG. 12 illustrates connection in the first winding group and the fourth winding group in which windings in the non-connection side coil end 242 are wound five turns with a seven slot pitch, and further wound one turn with a six slot pitch and an eight slot pitch so that the number of slots per pole and phase is two, and windings in the connection-side coil end 241 are turned with a five slot pitch.

In the connection-side coil end 241, slot pitches are different between the winding groups, for example, the first winding group and the fourth winding group have a five slot pitch, and the second winding group and the third winding group have a six slot pitch. However, for example, the twisting pitch having a five slot pitch in the first winding group and the fourth winding group is divided to have a two slot pitch in the layer 7 and the layer 1 and a three slot pitch in the layer 8 and the layer 2, and welding portions are aligned in an r-direction, as illustrated in FIG. 9, the configurations can include the first connection group and the second connection group, and the winding groups can be connected to each other without using another member. As described above, although slot pitches are different in the respective winding groups, the slot pitches in the respective layers are the same. Thus twisting can be performed simultaneously, and even a combination of different slot pitches can provide the same effects as those of the present configuration.

Figure 13A:
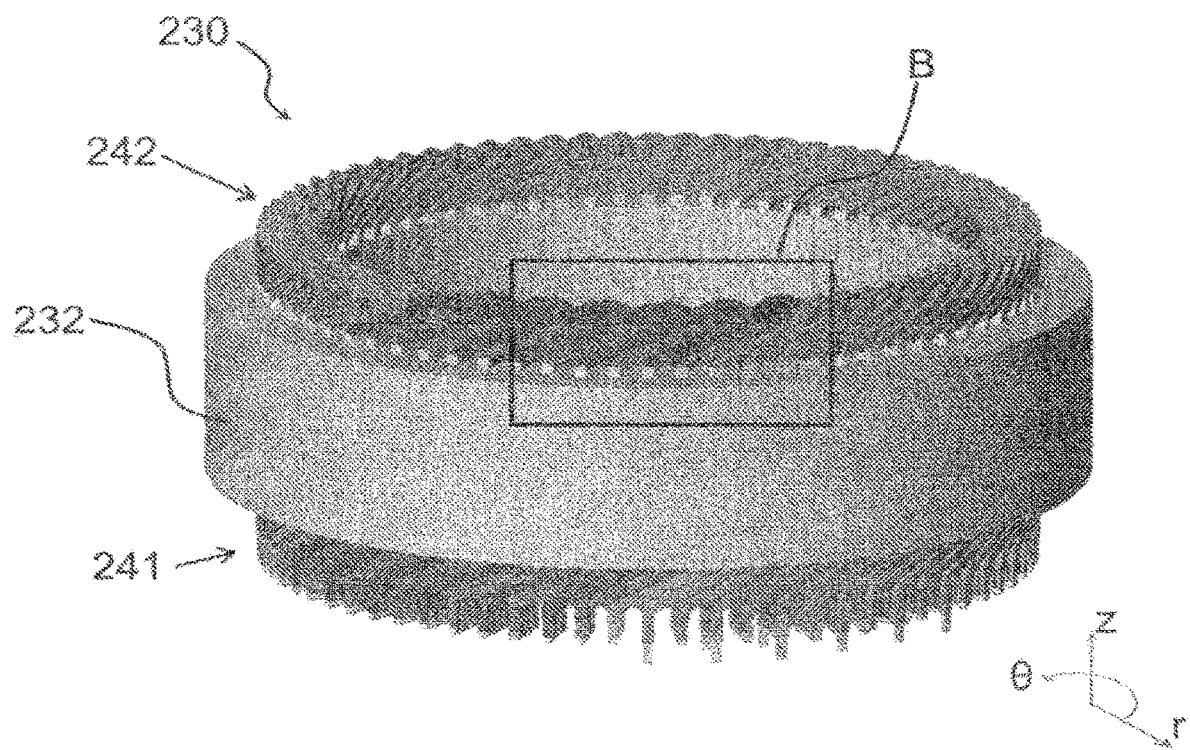
FIG. 13A is a perspective view of the stator 230.
Figure 13B:
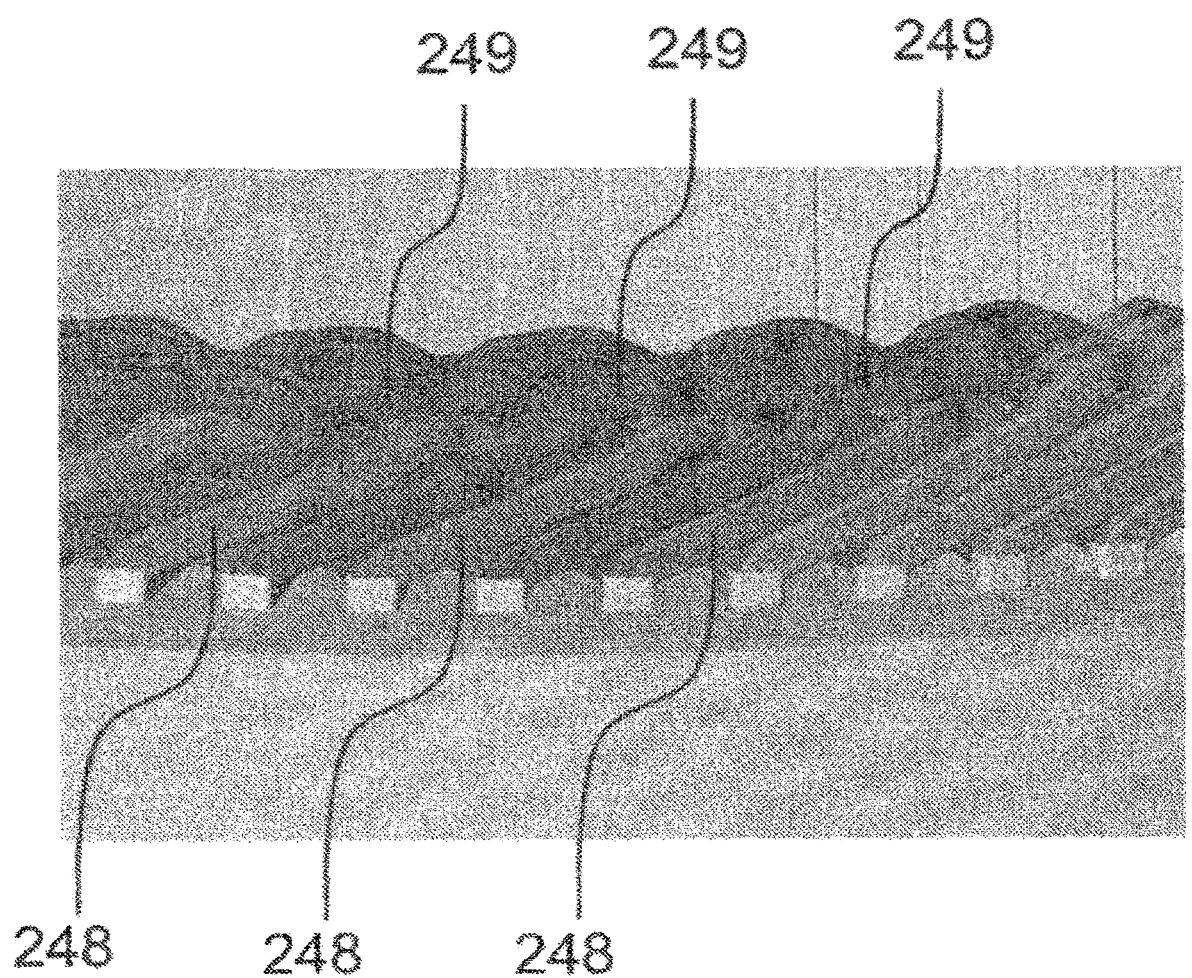
FIG. 13B is an enlarged view of a portion B of FIG. 13(a), where one kind of segment coil 248 spanning five slot pitches and one kind of segment coil 249 spanning seven slot pitches are provided for each winding group illustrated in the connection diagram of FIG. 11.

FIG. 13(a) is a perspective view of the stator 230, and FIG. 13(b) is an enlarged view of a portion B of FIG. 13(a), where one kind of segment coil 248 spanning five slot pitches and one kind of segment coil 249 spanning seven slot pitches are provided for each winding group illustrated in the connection diagram of FIG. 11.

In the present embodiment, the segment coil 248 spanning five slot pitches and the segment coil 249 spanning seven slot pitches are provided to be arranged vertically in a z-direction.

Owing to such arrangement, a plurality of segment coils spanning six slot pitches, segment coils 248 spanning five slot pitches, and segment coils 249 spanning seven slot pitches, which are wholly circumferentially assembled, can be achieved by segment coil shapes having a similar shape and manufactured by similar methods, enabling a compact shape in which the non-connection side coil end is not protrude in an r-direction.

For example, when the segment coil 249 spanning seven slot pitches is formed into a segment coil shape to be aligned not in the z-direction but in the r-direction, that is, on the outer peripheral side of the non-connection side coil end 242, only the segment coil 249 spanning seven slot pitches of a plurality of segment coils is required to be molded into various shapes to avoid the other segment coils, and difficulty is increased in producing the segment coil.

Therefore, as described above, in view of a simple production method and compactness of the non-connection side coil end 242, the segment coil 248 spanning five slot pitches and the segment coil 249 spanning seven slot pitches are preferably arranged vertically in the z-direction.

Note that the present invention is not limited to the above embodiments, and can include various alterations and modifications. For example, the above embodiments are described in detail for ease of understanding the present invention, and therefore, the present invention is not necessarily limited to a configuration including all of the configurations described above. Furthermore, part of a configuration of an embodiment can be replaced with a configuration of another embodiment, and a configuration of an embodiment can be added to a configuration of another embodiment. Still furthermore, for part of the configurations of the respective embodiments, additions, eliminations, or substitutions of another configuration may be made.

REFERENCE SIGNS LIST 21 power semiconductor (IGBT)
38 diode
100 vehicle
110 front wheel
120 engine
124 engine control device
130 transmission
134 transmission control device
160 differential gear
170 integrated control device
174 communication line
180 battery
184 battery control device
200 first rotary electric machine
202 second rotary electric machine
212 housing
214 end bracket
216 bearing
218 shaft
222 air gap
224 resolver
226 wear plate
230 stator
232 stator core
236 tooth
237 slot
238 stator winding
241 connection side coil end
242 non-connection side coil end
242a first winding group
242b second winding group
242c third winding group
242d fourth winding group
243 segment coil
244a terminal portion
244b terminal portion
245a terminal portion
245b terminal portion
246b second connection group
247a U1-phase lead wire
247b W1-phase neutral point
247c V1-phase lead wire
247d U2-phase neutral point
247e W2-phase lead wire
247f V2-phase neutral point
247g U1-phase neutral point
247h W1-phase lead wire
247i V1-phase neutral point
247j U2-phase lead wire
247k W2-phase neutral point
247n V2 phase lead wire 248 segment coil spanning five slot pitches
249 segment coil spanning seven slot pitches
252 connection point within a winding group
253 connection point
254 connection point
255 connection point
280 rotor
282 rotor core
283 hole
284 permanent magnet
284a permanent magnet
284b permanent magnet
287 hole space
600 power converter
610 power module
620 power module
630 capacitor module
642 connector board
644 transmission/reception circuit
646 control circuit board
648 control circuit
650 drive circuit board
652 first drive circuit
654 drive circuit board
656 second drive circuit
660 current sensor
662 current sensor
N1 neutral point
N2 neutral point

The invention claimed is:

1. A stator for a rotary electric machine comprising a plurality of segment coils which includes:
   connection-side winding portions which are arranged on one side of a stator core and connected to slots with the same slot pitch; and
   non-connection-side winding portions which are arranged on the other side of the stator core and inserted into the slots with a plurality of kinds of slot pitches,
   wherein the connection-side winding portions include:
   when n=1 or more,
   a first connection group connects between the terminal portions of segments of a 2n−1 layer and a 2n layer, and
   a second connection group connects between the terminal portions of segments of a 2n layer and a 2n+1 layer.

2. The stator for a rotary electric machine according to claim 1, wherein
   the connection-side winding portions are circumferentially connected to the slots with the same slot pitch in layers of the segment coils in a radial direction of the stator core.

3. The stator for a rotary electric machine according to claim 1, further comprising
   at least one output line which is provided in the connection-side winding portion.

4. The stator for a rotary electric machine according to claim 3, wherein
   a plurality of the terminal portions of the first connection group is aligned in a radial direction, and
   the output lines and a plurality of the terminal portions of the second connection group are arranged in a radial direction.

5. The stator for a rotary electric machine according to claim 3, wherein
   the output lines are arranged on an outermost peripheral side or an innermost peripheral side in a radial direction.

6. A rotary electric machine comprising the stator for a rotary electric machine according to claim 1.

* * * * *